United States Patent
Ueno

(10) Patent No.: US 6,486,922 B1
(45) Date of Patent: Nov. 26, 2002

(54) SYNCHRONIZATION METHOD OF IMAGE DECODER

(75) Inventor: Takafumi Ueno, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/402,836

(22) PCT Filed: Feb. 8, 1999

(86) PCT No.: PCT/JP99/00532
§ 371 (c)(1),
(2), (4) Date: Oct. 13, 1999

(87) PCT Pub. No.: WO99/43154
PCT Pub. Date: Aug. 26, 1999

(30) Foreign Application Priority Data

Feb. 20, 1998 (JP) .......... 10-038373

(51) Int. Cl.[7] .......... H04N 7/01; H04N 9/74; H04N 11/00
(52) U.S. Cl. .......... 348/589; 348/423.1; 348/584; 348/598
(58) Field of Search .......... 348/423.1, 425.1, 348/461, 465, 468, 584, 589, 598, 600; H04N 7/01, 11/00, 9/74

(56) References Cited

U.S. PATENT DOCUMENTS

| | | | | |
|---|---|---|---|---|
| 4,580,165 A | * | 4/1986 | Patton et al. | 358/148 |
| 5,579,057 A | * | 11/1996 | Banker et al. | 348/589 |
| 5,701,161 A | * | 12/1997 | Williams et al. | 348/468 |
| 5,710,573 A | * | 1/1998 | Hung et al. | 345/127 |
| 5,856,973 A | * | 1/1999 | Thompson | 370/389 |
| 5,883,610 A | * | 3/1999 | Jeon | 345/113 |
| 5,898,441 A | * | 4/1999 | Flurry | 345/507 |
| 6,111,611 A | * | 8/2000 | Ozkan et al. | 348/465 |

FOREIGN PATENT DOCUMENTS

| | | |
|---|---|---|
| JP | 62-281571 | 12/1987 |
| JP | 64-60155 | 3/1989 |
| JP | 64-89683 | 4/1989 |
| JP | 10-304270 | 11/1998 |

OTHER PUBLICATIONS

Hiroshi, Fujiwara, "Point zukaishiki saishin MPEG kyoukasho", 1st edition, Tokyo, Ascii Corp., 1995, p. 235–238, No Translation Provided.
The Institute of Image Information and Television Engineers, "Sougou multimedia sensho MPEG", 1st edition, Tokyo, Ohmusha, Ltd., 1996, p. 54–55, No Translation Provided.
Abstract of U.S. Patent No. 4,580,165.
Abstract of U.S. Patent No. 5,594,467.
Abstract of U.S. Patent No. 5710573.
Abstract of U.S. Patent No. 5,748, 252.

* cited by examiner

Primary Examiner—John Miller
Assistant Examiner—Brian Yenke
(74) Attorney, Agent, or Firm—Smith, Gambrell & Russell, LLP

(57) ABSTRACT

The image decoding apparatus includes first clock reproducing means 20 for reproducing the first clock signal 21 from a time stamp signal 19 extracted from a digital transport stream 5, decoding means 8 for decoding a digital video stream 7 and outputting the first digital video signal 9 synchronizing with the first clock signal 21 and having the first frame frequency, graphic generating means 10, overlaying means 12 for overlaying the first digital video signal 9 and the graphic signal 11 and outputting the first overlaid digital video signal 15 synchronizing with the first clock signal 21, and digital-to-analog converting means 16 for converting the first overlaid digital video signal 15 into an analog signal 17, and an image without any missing frames or display disturbances can be provided even when the digital video signal and the graphic signal are displayed being overlaid.

4 Claims, 10 Drawing Sheets

SYNCHRONIZATION METHOD OF IMAGE DECODER

TECHNICAL FIELD

The present invention relates to an image decoding apparatus such as a personal computer, for example, that receives digital broadcast signals where image-compressed moving pictures and program information are multiplexed, and decodes selected moving pictures to display them.

BACKGROUND ART

Apparatuses that capture television broadcasts and display them include an apparatus that digitizes analog television broadcasts and displays moving pictures on a personal computer.

FIG. 10 shows an example of the structure of a personal computer for receiving analog broadcasts. Reference numeral 101 represents an input high-frequency signal. Reference numeral 102 represents a tuner. Reference numeral 103 represents A/D converting means. Reference numeral 104 represents a digital video signal which is a digitized video signal. Reference numeral 10 represents graphic generating means. Reference numeral 11 represents a graphic signal. Reference numeral 12 represents overlaying means. Reference numeral 13 represents a memory. Reference numeral 14 represents memory control means. Reference numeral 22 represents a memory data signal. Reference numeral 107 represents a overlaid digital video signal. Reference numeral 16 represents D/A converting means. Reference numeral 108 represents an analog video signal. Reference numeral 18 represents display means such as a CRT display. Reference numeral 105 represents timing generating means. Reference numeral 106 represents a clock for D/A conversion.

Here, the graphic signal 11 is a signal for causing graphics such as so-called icons and window frames to be displayed on the display screen of the personal computer.

In FIG. 10, the input high-frequency signal 101 is channel-selected by the tuner 102 and is digitized by the A/D converting means 103, the digitized video signal 104 is overlaid on the graphic signal 11 by the overlaying means 12, and the overlaid digital video signal 107 is supplied to the D/A converting means 16 and is output as the analog video signal 108.

The timing generating means 105 generates a display reference clock 106, which is supplied to the memory control means 14 so as to be used as a reading reference clock for reading the overlaid digital video signal from the memory and is supplied to the D/A converting means 16 so as to be used as a D/A conversion reference clock.

However, in this conventional image display apparatus, the overlaid digital video signal 107 is read out from the memory means 13 based on the display reference clock 106 that is most suitable for display of a personal computer. For this reason, the timing of the reading and the timing of writing of the digital video signal 104 to the memory means 13 are asynchronous to each other, so that a problem arises that in the digital video signal 104, after the D/A conversion, disturbances in displayed images such as tearing artifacts of display frames and missing frames are caused on the display means 18.

This problem similarly arises when digitally compressed video signals such as MPEG-compressed video signals are captured by a personal computer in order to support digital broadcasts which will emerge in the future.

DISCLOSURE OF THE INVENTION

In view of this conventional problem, an object of the present invention is to provide an image decoding apparatus in which disturbances in digital video images are'substantially not caused even when digitally compressed image signals are used and overlaid on graphic signals and the overlaid image is displayed.

The first present invention(corresponding to the invention of claim 1) is an image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

decoding means for decoding the digital video bit stream and outputting a first digital video signal having a first frame frequency and synchronizing with the first clock signal;

graphic generating means for generating a graphic signal;

overlaying means for overlaying the first digital video signal and the graphic signal and outputting a first overlaid digital signal synchronizing with the first clock signal;

memory means for storing at least the first digital video signal; and digital-to-analog converting means for converting the first overlaid digital signal into a first analog signal in synchronization with the first clock signal.

The second present invention(corresponding to the invention of claim 2) is an image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream and outputting a first digital video signal having a first frame frequency and synchronizing with the first clock signal;

graphic generating means for generating a graphic signal;

overlaying means for overlaying the first digital video signal and the graphic signal and outputting a second overlaid digital signal synchronizing with the second clock signal and having a second frame frequency;

memory means for storing at least the first digital video signal; and digital-to-analog converting means for converting the second overlaid digital signal into a second analog signal in synchronization with the second clock signal.

The third present invention(corresponding to the invention of claim 3) is an image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream and outputting a first digital video signal having a first frame frequency and synchronizing with the first clock signal;

graphic generating means for generating a graphic signal;

interpolating means for outputting a second digital video signal obtained by increasing a spatial resolution of the first digital video signal;

overlaying means for overlaying the second digital video signal and the graphic signal and outputting a third overlaid digital signal synchronizing with the second clock signal;

memory means for storing at least the second digital video signal; and digital-to-analog converting means for converting the third overlaid digital signal into a third analog signal in synchronization with the second clock signal.

The fourth present invention(corresponding to the invention of claim 4) is an image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream and outputting a first digital video signal having a first frame frequency and synchronizing with the first clock signal;

graphic generating means for generating a graphic signal;

decimating means for outputting a third digital video signal obtained by decreasing a spatial resolution of the first digital video signal;

overlaying means for overlaying the third digital video signal and the graphic signal and outputting a fourth overlaid digital signal synchronizing with the second clock signal;

memory means for storing at least the third digital video signal; and digital-to-analog converting means for converting the fourth overlaid digital signal into a fourth analog signal in synchronization with the second clock signal.

The fifth present invention(corresponding to the invention of claim 5) is an image decoding apparatus according to the first present invention, further comprising:

timing generating means for generating a third clock signal independent of the first clock signal; and switching means for choosing one clock signal between the first clock signal and the third clock signal and outputting the chosen clock signal, wherein the digital-to-analog converting means is synchronized with the clock signal output from the switching means.

The sixth present invention(corresponding to the invention of claim 6) is an image decoding apparatus according to the second present invention, further comprising:

timing generating means for generating a third clock signal independent of the second clock signal; and switching means for choosing one clock signal between the second clock signal and the third clock signal and outputting the chosen clock signal, wherein the digital-to-analog converting means is synchronized with the clock signal output from the switching means.

The seventh present invention (corresponding to the invention of claim 7) is an image decoding apparatus according to the third present invention, further comprising:

timing generating means for generating a third clock signal independent of the second clock signal; and switching means for choosing one clock signal between the second clock signal and the third clock signal and outputting the chosen clock signal, wherein the digital-to-analog converting means is synchronized with the clock signal output from the switching means.

The eighth present invention (corresponding to the invention of claim 8) is an image decoding apparatus according to the fourth present invention, further comprising:

timing generating means for generating a third clock signal independent of the second clock signal; and switching means for choosing one clock signal between the second clock signal and the third clock signal and outputting the chosen clock signal, wherein the digital-to-analog converting means is synchronized with the clock signal output from the switching means.

As is apparent from the above description, the present invention has an advantage that disturbances in digital video images are substantially not caused even when a overlaid image formed by overlaying a digital video signal and a graphic signal is displayed.

EXPLANATION OF REFERENCE NUMERALS

Figure 1:
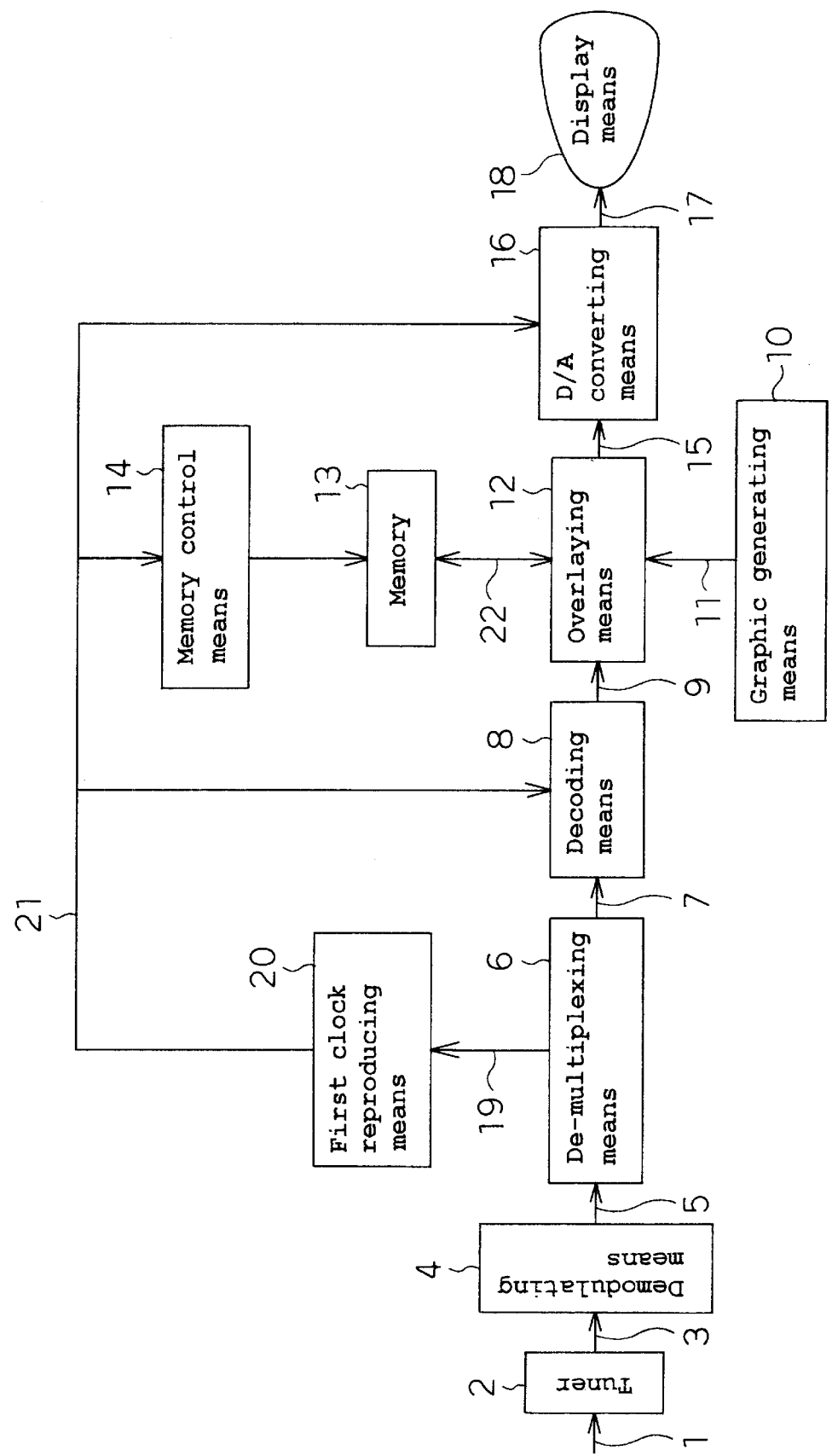
FIG. 1 is a block diagram of an image decoding apparatus according to the first embodiment of the present invention.

1 Input high-frequency signal
8 Decoding means
10 Graphic generating means
12 Overlaying means 13 Memory
16 D/A converting means
20 First clock reproducing means
21 First clock signal
31 Second clock reproducing means
32 Second clock signal

BEST MODE FOR CARRYING OUT THE INVENTION

First Embodiment

An image decoding apparatus according to the first invention of the: present application is a decoding apparatus in which a digital transport stream is input and decoded that is obtained by multiplexing a digital video bit stream obtained by coding an image by frame coding or field coding, and a time stamp signal. The digital video bit stream and the time stamp signal are extracted from the digital transport stream by de-multiplexing means. The first clock signal is reproduced from the time stamp signal by the first clock reproducing means. Decoding means decodes the digital video bit stream, and outputs the first digital video signal having the first frame frequency and synchronizing with the first clock signal. At least the first digital video signal is written into the memory 13. Overlaying means reads out the first digital video signal read out from memory means, overlays the first digital video signal and a graphic signal generated by graphic generating means, and outputs the first overlaid digital signal synchronizing with the first clock signal. D/A converting means converts the first overlaid digital signal into the first analog signal in synchronization with the first clock signal.

Hereinafter, the first embodiment of the present invention will be described with reference to a drawing.

FIG. 1 is a block diagram of an image decoding apparatus according to the first embodiment of the present invention. The structure of this embodiment will hereinafter be described with reference to this figure.

Figure 10:
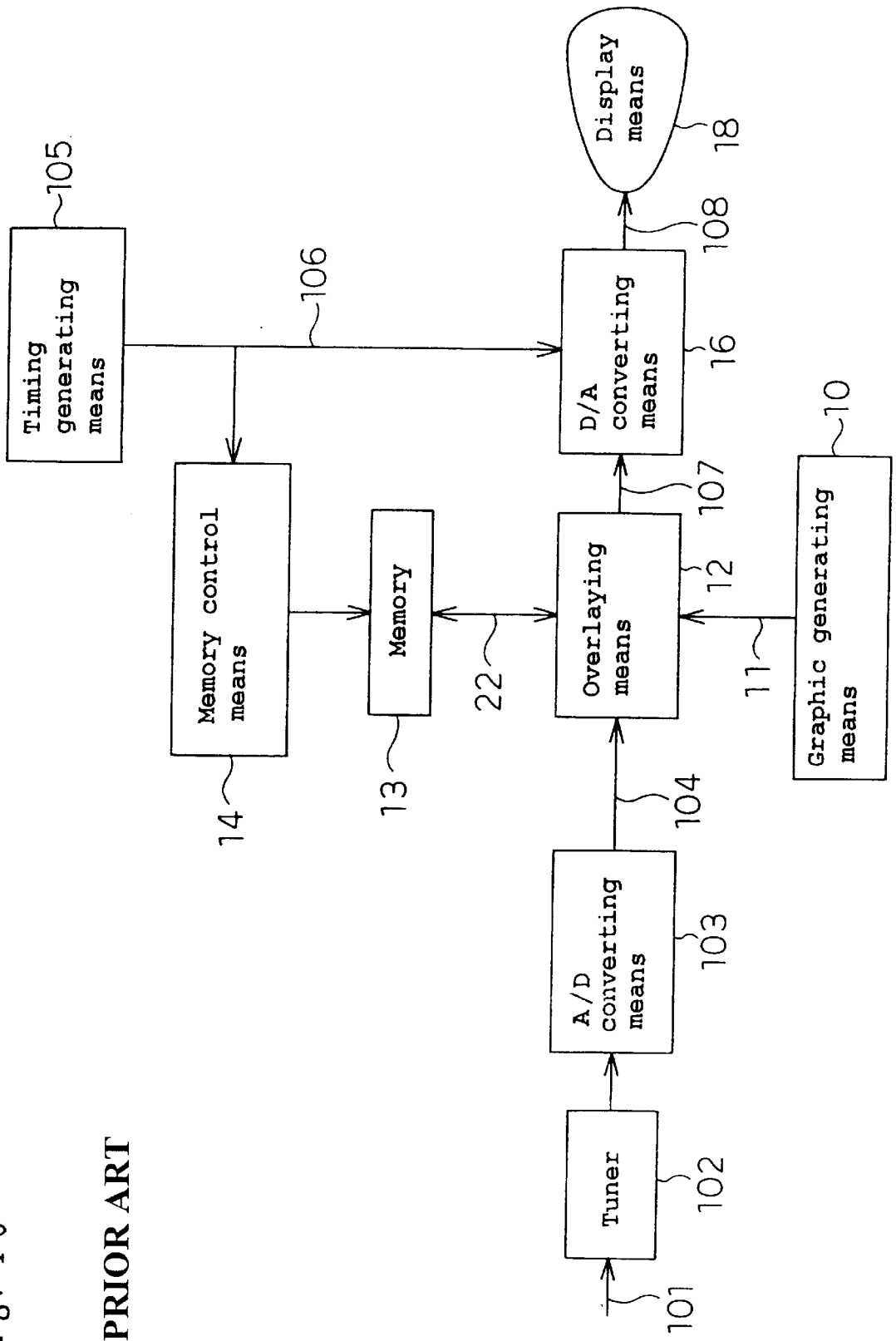
FIG. 10 is a view of the example of the structure of the conventional personal computer for receiving analog broadcasts.

In FIG. 1, the means denoted by reference numerals 10 to 14, 16, 18 and 22 are the same as the means denoted by the same reference numerals in the conventional example shown in FIG. 10. Therefore, descriptions thereof are omitted.

In the figure, reference numeral 1 represents an input high-frequency signal, reference numeral 2 represents a tuner, reference numeral 3 represents a channel-selected digital modulated signal, and reference numeral 4 represents demodulating means for demodulating the modulated signal 3. Reference numeral 5 represents the digital transport stream after demodulation. In this example, the digital transport stream 5 complies with MPEG-2 (ISO/IEC13818-1). Reference numeral 6 represents the de-multiplexing means. Reference numeral 7 represents a digital video bit stream coded in compliance with MPEG-2 (ISO/IEC13818-2). Reference numeral 8 represents the decoding means for decoding the digital video bit stream 7. Reference numeral 9 represents the first digital video signal. Reference numeral 15 represents the first overlaid digital video signal. Reference numeral 17 represents the first analog signal. Reference numeral 19 represents the time stamp signal output from the de-multiplexing means. Reference numeral 20 represents the first clock reproducing means comprising a PLL or the like. Reference numeral 211 represents the first clock signal. Here, the digital video bit stream 7 is one obtained by compressing, in compliance with MPEG-2/H-14, a video signal with 480 active scanning lines (525 lines when blanking is included), 704 active pixels per line (858 pixels per line when blanking is included) and the first frame frequency of 59.94 frames per second.

The operation of the image decoding apparatus thus structured will be described below.

The input high-frequency signal 1 is channel-selected by the tuner 2. The digital modulated signal 3 of the selected channel is supplied to the demodulating means 4 to be demodulated, so that the digital transport stream 5 is obtained. From the digital transport stream 5, the digital video bit stream 7 and the time stamp signal 19 are separated by the de-multiplexing means 6.

The digital video bit stream 7 is decompressed by the decoding means 8 and the first digital video signal 9 is output. The time stamp signal 19 is supplied to the first clock reproducing means 20. As the first clock signal 21, a clock of 27 MHz (accurately, 26.999973 MHz) corresponding to the total number of samples per second is reproduced.

The first clock signal 21 is supplied to the decoding means 8 to be used as a sample clock for outputting the first digital video signal 9, and simultaneously therewith, the first clock signal 21 is supplied to the memory control means 14 to be used as a clock for writing and reading the active pixels of the first digital video signal 9 to and from the memory 13 and is supplied to the D/A converting means 16 to be used as a reference clock for D/A conversion. The first clock signal 21 is also supplied to the overlaying means 12 to be used as a reference clock for outputting the first overlaid digital signal 15.

The graphic generating means 10 generates graphic data such as icons.

In this embodiment, the memory 13 has an input buffer area into which the first digital video signal is written and an output buffer area into which the first overlaid digital signal is written.

The memory control means 14 writes the first digital video signal 9 into the input buffer area of the memory 13 by way of the memory data signal 22 with reference to the first clock signal 21.

The overlaying means 12 reads out the first digital video signal written in the input buffer area of the memory 13 by the memory data signal 22, overlays it with the graphic signal 11 into the first overlaid digital video signal 15 and writes the signal 15 into the output buffer area of the memory 13.

Then, in synchronization with the first clock signal 21, the first overlaid digital signal 15 read out from the output buffer area of the memory 13 by way of the memory data signal 22 (the overlaying means 12) is supplied to the D/A converting means.

The D/A converting means is supplied with the first clock signal 21, and in synchronization with the first clock signal 21, the first overlaid digital signal 15 is converted into the analog video signal 17 and displayed on the display means 18.

As the method of generating the first overlaid digital signal, the above-described method has been explained in which the first digital video signal 9 is written into the input buffer area of the memory 13 and the first overlaid digital signal 15 is written into the output buffer area of the memory 13 both by way of the memory data signal 22. However, the method is not limited thereto; for example, a method is possible in which only the first digital video signal 9 is written into and read from the input buffer area of the memory 13 (frame memory) by way of the memory data signal 22, and the first digital video signal 9 being read out is overlaid on the graphic signal 11 by the overlaying means 12, temporarily held in a predetermined memory of the overlaying means 12 for timing and then, supplied to the D/A converting means as the first overlaid digital signal 15 in synchronization with the first clock signal 21. In this case, only the input buffer area is necessary for the memory 13.

As described above, in the first embodiment of the present invention, the first digital video signal 9 output from the decoding means 8, the first overlaid digital signal 15 read out from the memory 13 by way of the memory data signal 22, and the D/A converting means 16 are synchronized with one another, so that display can be provided on the display means 18 without any display frame disturbances being caused.

Second Embodiment

An image decoding apparatus according to the second invention of the present application is a decoding apparatus in which a digital transport stream is input and decoded that is obtained by multiplexing a digital video bit stream obtained by coding an image by frame coding or field coding, and a time stamp signal. De-multiplexing means extracts the digital video bit stream and the time stamp signal from the digital transport stream. First clock reproducing means reproduces the first clock signal from the time stamp signal. Second clock reproducing means reproduces the second clock signal from the first clock reproducing means. Decoding means decodes the digital video bit stream, and outputs the first digital video signal having the first frame frequency and synchronizing with the first clock signal. At least the first digital video signal is written into the memory 13. Overlaying means overlays a graphic signal generated by graphic generating means and the first digital video signal read out from the memory 13, and outputs the second overlaid digital signal synchronizing with the first clock signal and having the second frame frequency. D/A converting means converts the second overlaid digital signal into the second analog signal in synchronization with the second clock signal.

Hereinafter, the second embodiment of the present invention will be described with reference to drawings.

Figure 2:
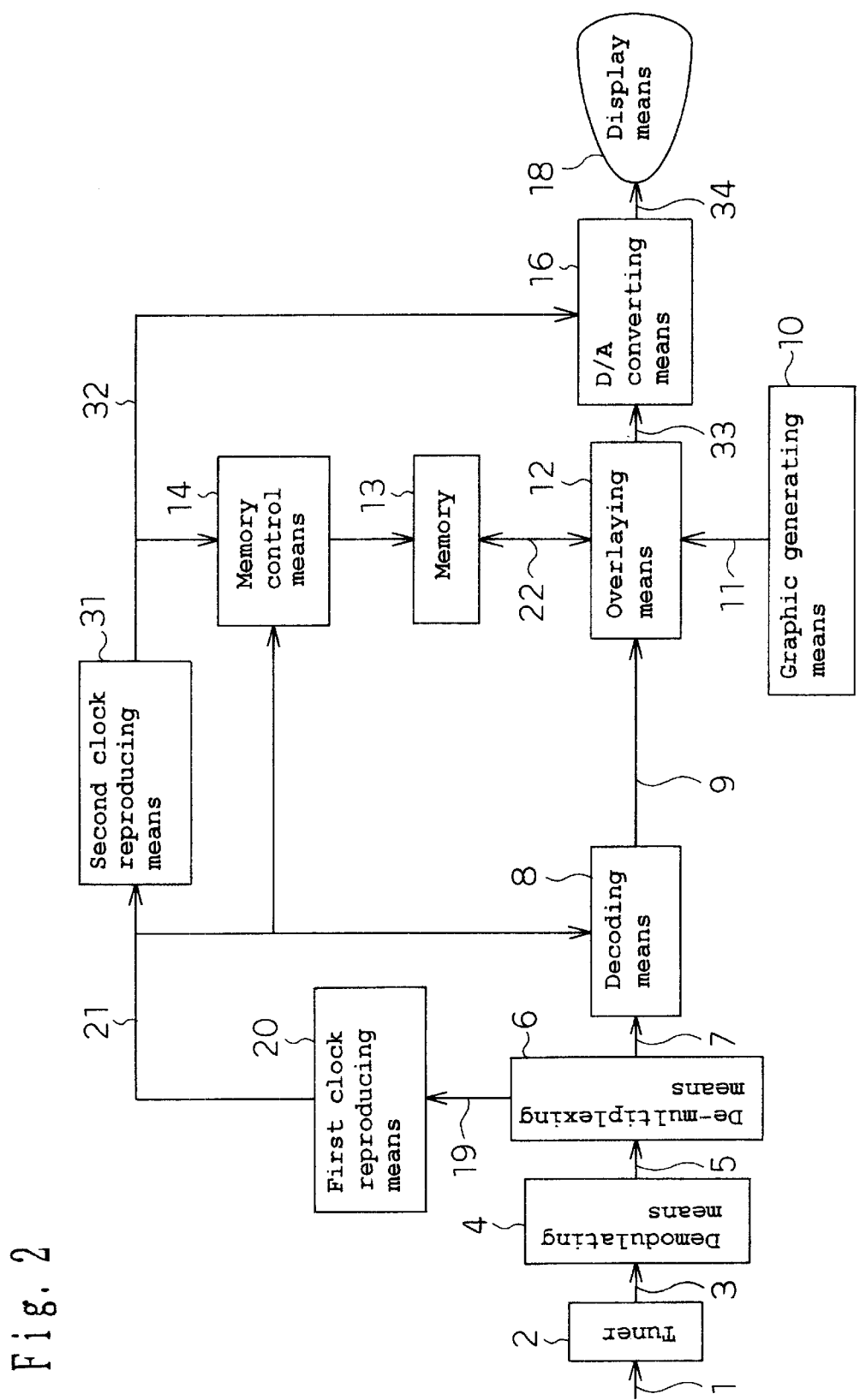
FIG. 2 is a block diagram of an image decoding apparatus according to the second embodiment of the present invention.

FIG. 2 is a block diagram of the second embodiment of the present invention. The difference of the second embodiment of the present invention from the first embodiment of the present invention is that image signals having a different frame frequency from the frame frequency of the first digital video signal 9 output from the decoding means 8 can be displayed. In this embodiment, the frame frequency of the first digital video signal 9 is 24 Hz and the second frame frequency is 60 Hz. In FIG. 2, the elements 10 to 14, 16 to 18 and 22 are the same as those of the conventional example shown in FIG. 10, and the elements 1 to 9 are the same as those of the first embodiment of the present invention shown if FIG. 1. Reference numeral 31 represents the second clock reproducing means. Reference numeral 32 represents the second clock signal. Reference numeral 33 represents the second overlaid digital signal. Reference numeral 34 represents the second analog signal.

Figure 3:
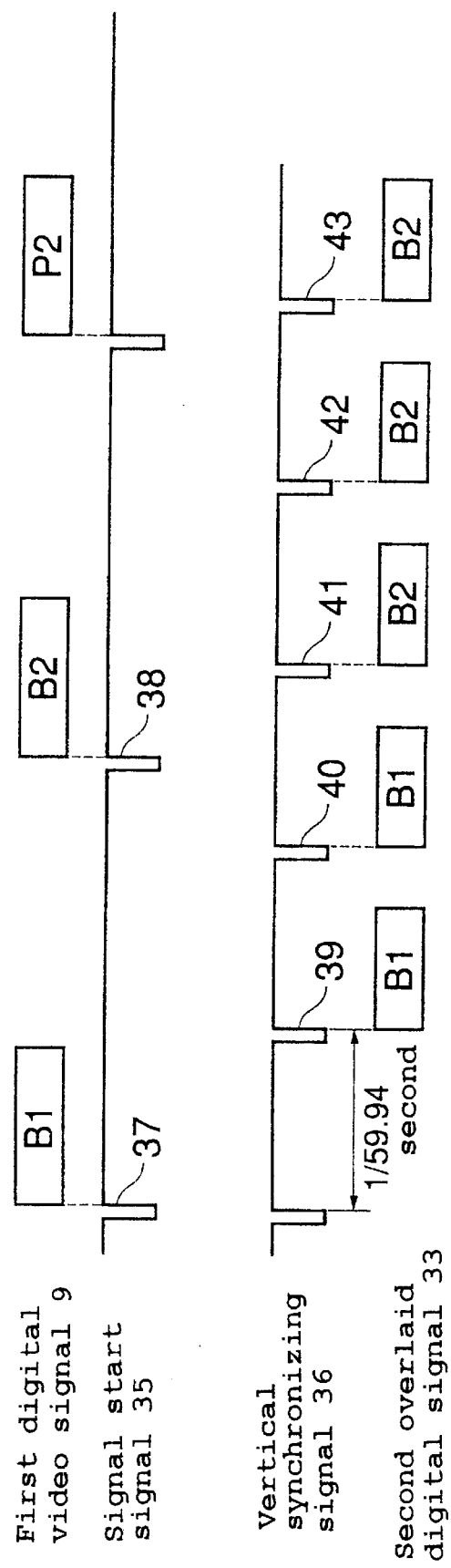
FIG. 3 is a timing chart in the image decoding apparatus according to the second embodiment of the present invention.

In FIG. 3, reference numeral 35 represents a decoding start signal, reference numeral 36 represents a vertical synchronizing signal, reference numerals 37 and 38 represent pulses of the decoding start signal 35, and reference numerals 39 and 40 represent pulses of the vertical synchronizing signal 36.

Here, the digital video bit stream 7 is one obtained by compressing, in compliance with MPEG-2/H-14, a video signal with 720 active scanning lines (750 lines when blanking is included), 1280 active pixels per line (1650 pixels per line when blanking is included) and the first frame frequency of 24 frames per second. The first frame frequency thereof is 24 frames per second.

In FIG. 3, while B1 and B2 represent bidirectional predictive images in MPEG-2 coding and P2 represents a forward predictive image in MPEG-2 coding, generality is not deteriorated.

The operation of the image decoding apparatus thus structured will be described below.

In FIG. 2, the process from the channel selection from the input high-frequency signal 1 to the reproduction of the first digital video signal 9 and the time stamp signal 19 is the same as that of the first embodiment.

Since the sample clock of the first digital signal 9 is obtained as 29.7 MHz as the total number of samples per second including blanking, 29.7 MHz is generated as the first clock signal 21 by the first clock reproducing means 20 and is supplied to the decoding means 8 and the memory control means 14.

Since the second frame frequency is 2.5 times the first frame frequency, the number of. samples per second is 2.5 times. Therefore, the first clock signal 21 is multiplied by 5/2 by the second clock reproducing means 31 to generate 74.25 MHz as the second clock signal 32, which is supplied to the memory control means 14 and the D/A converting means 32.

In this embodiment, the memory control means 14 uses the first clock signal 21 as a clock for writing to the memory 13 and uses the second clock signal 32 as a clock for reading from the memory 13.

In this embodiment, the memory 13 has an input buffer area into which the first digital video signal is written and an output buffer area into which the second overlaid digital signal 33 is written.

The memory control means 14 writes the first digital video signal 9 into the input buffer area of the memory 13 by way of the memory data signal 22 in synchronization with the first clock signal 21.

The overlaying means 12 reads out the first digital video signal written in the input buffer area of the memory 13, overlays the first digital video signal and the graphic signal into the second overlaid digital video signal 33, and writes the signal 33 into the output buffer area of the memory 13.

Then, the second overlaid digital signal 33 read out from the output buffer area of the memory 13 at a timing with reference to the second clock signal 32 is supplied to the D/A converting means 16.

The D/A converting means 16 is supplied with the second clock signal 32, and in synchronization with the second clock signal 32, the second overlaid digital signal 33 is converted into the analog video signal 17 and displayed on the display means 18.

FIG. 3 shows the timing of the display. The first digital signal 9 is input to the overlaying means 12 at the pulse 37 with reference to the first clock signal and is written in to the memory 14.

As shown in FIG. 3, the first digital video signal 9, that is, B1 is written into the memory 14 once at the timing of the pulse 37 with reference to the first clock signal.

The second overlaid digital signal 33 is read out from the memory 14 twice at the pulses and 40, and is output. Likewise, as shown in FIG. 3, the first digital video signal 9, that is, B2 is written into the memory 14 once at the timing of the pulse 38 in synchronization with the first clock signal.

The second overlaid digital signal 33 is read out from the memory 14 three times at the pulses 41, 42 and 43, and is output. Consequently, the second overlaid digital signal has, as the second frame frequency, 60 Hz which is 2.5 times the first frame frequency 24 Hz. Further, the second overlaid digital signal 33 is converted from a digital signal to an analog signal by the D/A converting means 16 of FIG. 2 in synchronization with the second clock signal, thereby obtaining the second analog signal 34 of FIG. 2.

As the method of generating the second overlaid digital signal, in addition to the above-described method in which the first digital video signal 9 is written into the input buffer area of the memory 13 and the second overlaid digital signal 3 is written into the output buffer area of the memory 13 both by way of the memory data signal 22, a method is possible in which only the first digital video signal 9 is written into and read from the input buffer area of the memory 13 by way of the memory data signal 22, is overlaid on the graphic signal 11 by the overlaying means 12, and is then supplied to the D/A converting means as the second overlaid digital signal 33 in synchronization with the second clock signal 31. In this case, only the input buffer area is necessary for the memory 13.

The same applies when the digital bit stream 7 is one obtained by compressing a video signal with 720 active scanning lines (750 lines when blanking is included), 1280 active pixels per line (1650 pixels per line when blanking is included) and the first frame frequency of 60 frames per second in compliance with MPEG-2/H-14, and the frame frequency of the second overlaid digital signal 33 is 120 Hz. In this case, since the display frequency is 120 Hz, flicker can more effectively be reduced.

As described above, in the second embodiment of the present invention, since the second overlaid digital video signal 33 is synchronized with the second clock signal 32 and the D/A conversion by the D/A converting means 16 is performed in synchronization with the second clock signal 32, the second analog video signal having a frame frequency 2.5 times that of the first digital video signal 9 can be displayed on the display means 18 without any display frame disturbances being caused.

Third Embodiment

An image decoding apparatus according to the third invention of the present application is a decoding apparatus in which a digital transport stream is input and decoded that is obtained by multiplexing a digital video bit stream obtained by coding an image by frame coding or field coding, and a time stamp signal. De-multiplexing means extracts the digital video bit stream and the time stamp signal from the digital transport stream. First clock reproducing means reproduces the first clock signal from the time stamp signal. Second clock reproducing means reproduces the second clock signal from the first clock reproducing means. Decoding means decodes the digital video bit stream, and outputs the first digital video signal having the first frame frequency and synchronizing with the first clock signal. Interpolating means outputs the second digital video signal obtained by increasing the spatial resolution of the first digital video signal. At least the second digital video signal is written into the memory 13. Overlaying means overlays a graphic signal generated by graphic generating means and the second digital video signal read out from the memory means, and outputs the third overlaid digital signal synchronizing with the second clock signal. D/A converting means converts the third overlaid digital signal into the third analog signal in synchronization with the second clock signal.

Hereinafter, the third embodiment of the present invention will be described with reference to a drawing.

Figure 4:
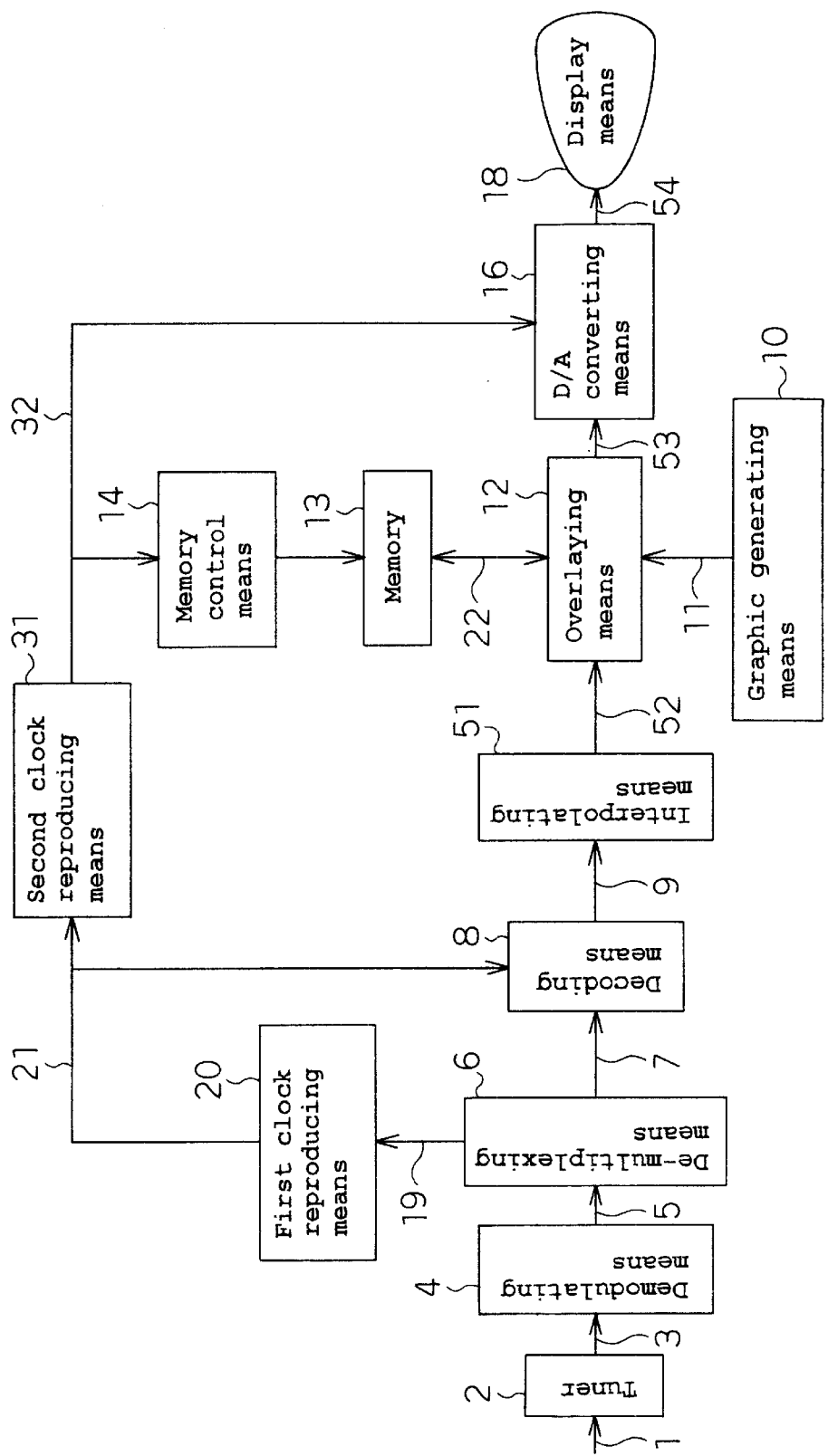
FIG. 4 is a block diagram of an image decoding apparatus according to the third embodiment of the present invention.

FIG. 4 is a block diagram of the third embodiment of the present invention. The difference of the third embodiment of the present invention from the second embodiment of the present invention is that it is made possible to interpolate the first digital video signal 9 to provide high-resolution display.

In FIG. 4, the elements 10 to 14, and 16 to 18 are the same as those of the conventional examples shown in FIG. 10. The elements 1 to 9 are the same to those of the first embodiment of the present invention shown in FIG. 1. The elements 31 to 32 are the same as those of the second embodiment of the present invention shown in FIG. 2.

Reference numeral 51 represents the interpolating means. Reference numeral 52 represents the second digital video signal. Reference numeral 53 represents the third overlaid digital signal. Reference numeral 54 represents the third analog signal.

Here, the digital bit stream 7 is one obtained by compressing a video signal with 480 active scanning lines, 704 active pixels per line and 59.94 frames per second in compliance with MPEG-2/H-14. Moreover, the second digital video signal 52 has 720 active scanning lines (750 lines when blanking is included), 1280 active pixels per line (1650 pixels per line when blanking is included) and 60 frames per second.

The operation of the image decoding apparatus thus structured will be described below.

The first digital video signal 9 output from the decoding means 8 is supplied to the interpolating means 51. The interpolating means 51 increases the number of active scanning lines from 480 to 720 by a vertical filter comprising a transversal filter, and increases the number of active pixels from 704 per line to 1280 per line in a horizontal direction by a horizontal filter also comprising a transversal filter. The resultant signal is output as the second digital video signal 52.

The second clock reproducing means 31 generates the second clock signal 32 depending. on the contents of the interpolation by the interpolating means 51. The second clock signal 32 is generated by gradually doubling the first clock signal 21 by a PLL. That is, in this embodiment, although the frame frequency is not increased unlike in the second embodiment, since the number of pixels of the frame image of the digital video signal after interpolation is larger than that before interpolation because of the increase in spatial resolution, it is necessary that the clock for reading have a higher frequency than the reference clock before interpolation, and the frequency depends on the contents of the interpolation. Specifically, the frequency of the second clock signal 32 is obtained in the following manner:

That is, the ratio of the number of pixels per second, including blanking, of the second digital video signal 25 to that of the first digital video signal 9 is obtained by the following expression (Expression 1) as:

$$(750/525) \times (1650/858) \times (60/59.94) = 2.75. \qquad \text{(Expression 1)}$$

Therefore, the frequency of the second clock signal 32 is 74.25 MHz which is obtained by multiplying 27 MHz by 2.75.

In this embodiment, since the second digital video signal 52 is generated by increasing the spatial resolution of the first digital video signal 9 by the interpolating means 51 as described above, the timing of writing and reading to and from the memory 13 synchronizes with the second clock signal 32.

In this embodiment, the memory 13 has an input buffer area into which the second digital video signal 52 is written and an output buffer area into which the third overlaid digital signal 53 is written.

The memory control means 14 writes the second digital video signal 52 into the input buffer area of the memory 13 by way of the memory data signal 22 with reference to the second clock signal 32.

The overlaying means 12 reads out, by the second clock signal 32, the second digital video signal 52 written in the memory 13 by the memory data signal 22, overlays the signal 52 and the graphic signal 11 into the third overlaid digital video signal 53, and writes the signal 53 into the output buffer area of the memory 13.

Then, in synchronization with the second clock signal 32, the third overlaid digital signal 53 is output from the memory 13 by way of the memory data signal 22, and is supplied to the D/A converting means.

The third overlaid digital signal 53 is converted into the third analog signal 54 by the D/A converting means 16 in synchronization with the second clock signal 32.

As the method of generating the third overlaid digital signal, in addition to the above-described method in which the second digital video signal 52 is written into the input buffer area of the memory 13 and the third overlaid digital signal 53 is written into the output buffer area of the memory 13 both by way of the memory data signal 22, a method is possible in which only the second digital video signal 52 is written into and read from the input buffer area of the memory 13 by way of the memory data signal 22 and the second digital signal 52 being read out is overlaid on the graphic signal 11 by the overlaying means 12 and is then supplied to the D/A converting means as the third overlaid digital signal 53 in synchronizaiton with the second clock signal 32. In this case, only the input buffer area is necessary for the memory 13.

As described above, in the third embodiment of the present invention, since the third overlaid digital video signal 53 synchronizes with the second clock signal 32 and the D/A conversion is performed in synchronization with the second clock signal 32, the third analog video signal obtained by increasing the spatial resolution of the first digital video signal 9 can be displayed on the display means 18 without any display frame disturbances being caused.

Fourth Embodiment

An image decoding apparatus according to the fourth invention of the present application is a decoding apparatus in which a digital transport stream is input and decoded that is obtained by multiplexing a digital video bit stream obtained by coding an image by frame coding or field coding, and a time stamp signal. De-multiplexing means extracts the digital video bit stream and the time stamp signal from the digital transport stream. First clock reproducing means reproduces the first clock signal from the time stamp signal. Second clock reproducing means reproduces the second clock signal from the first clock reproducing means Decoding means decodes the digital video bit stream, and outputs the first digital video signal having the first frame frequency and synchronizing with the first clock signal. Decimating means outputs the third digital video signal obtained by decreasing the spatial resolution of the first digital video signal. At least the third digital video signal is written into the memory 13. Overlaying means overlays a graphic signal generated by graphic generating means and the third digital video signal read out from the memory, and outputs the fourth overlaid digital signal synchronizing with the second clock signal. D/A converting means converts the fourth overlaid digital signal into the fourth analog signal in synchronization with the second clock signal.

Hereinafter, the fourth embodiment of the present invention will be described with reference to a drawing.

Figure 5:
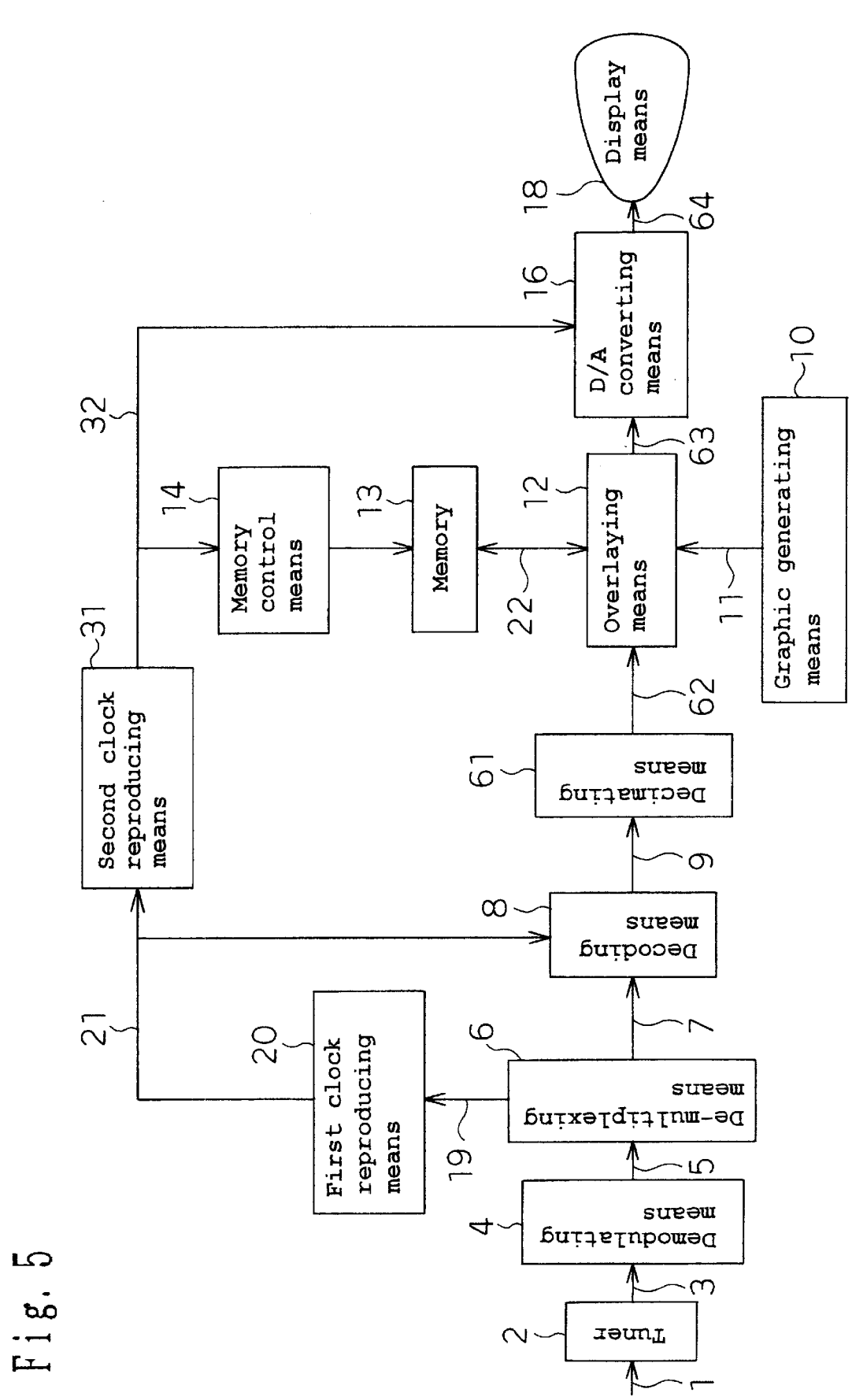
FIG. 5 is a block diagram of an image decoding apparatus according to the fourth embodiment of the present invention.

FIG. 5 is a block diagram of the fourth embodiment of the present invention. The difference of the fourth embodiment of the present invention from the second embodiment of the present invention is that the first digital signal 9 can be displayed being thinned out.

In FIG. 5, the elements 10 to 14, 16 and 18 are the same as those of the conventional example shown in FIG. 10, the elements 1 to 9 are the same as those of the first embodiment of the present invention shown in FIG. 1, and the elements 31 to 32 are the same as those of the second embodiment of the present invention shown in FIG. 2.

Reference numeral 61 represents the decimating means. Reference numeral 62 represents the third digital video signal. Reference numeral 63 represents the fourth overlaid digital signal. Reference numeral 64 represents the fourth analog signal signal. Reference numeral 63 represents the fourth overlaid digital signal. Reference numeral 64 represents the fourth analog signal.

Here, the digital bit stream 7 is one obtained by compressing, in compliance with MPEG-2/H-14, a video signal with 720 active scanning lines (750 lines when blanking is included) 1280 active pixels per line (1650 pixels per line when blanking is included) and 60 frames per second. The second digital video signal 52 has 480 active scanning lines (525 lines when blanking is included), 704 active pixels per line (858 pixels per line when blanking is included) and 59.94 frames per second.

The operation of the image decoding apparatus thus structured will be described below.

The first digital video signal output from the decoding means 8 is supplied to the decimating means 61. The decimating means 61 decreases the number of active scanning lines from 720 to 480 by a vertical filter comprising a transversal filter, and decreases the number of active pixels from 1280 per line to 720 per line in a horizontal direction by a horizontal filter also comprising a transversal filter. The resultant signal is output as the second digital video signal 52.

The second clock reproducing means 31 generates the second clock signal 32 depending on the contents of the decimating by the decimating means 61. The second clock signal 32 is generated by frequency-dividing the first clock signal 21. That is, in this embodiment, although the frame frequency is not increased unlike in the second embodiment, since the number of pixels of the frame image of the digital video signal after decimation is smaller than that before decimation because of the decrease in spatial resolution, it -is necessary that the clock for reading have a lower frequency than the reference clock before decimation, and the frequency depends on the contents of the decimation. Specifically, the frequency of the second clock signal 32 is obtained in the following manner:

That is, the ratio of the number of pixels per second, including blanking, of the third digital video signal 62 to that of the first digital video signal 9 is obtained by the following expression (Expression 2) as:

$(525/750) \times (858/1650) \times (59.94/60) = 1/2.75.$  (Expression 2)

Therefore, the frequency of the second clock signal 32 is 27 MHz which is obtained by multiplying 74.25 MHz by 1/27.

In this embodiment, since the third digital video signal 62 is generated by decreasing the spatial resolution of the first digital video signal 9 by the decimating means 61 as described above, the timing of writing and reading to and from the memory 13 synchronizes with the'second clock signal 32.

In this embodiment, the memory 13 has an input buffer area into which the third digital video signal 62 is written and an output buffer area into which the fourth overlaid digital signal 63 is written.

The memory control means 14 writes the third digital video signal 62 into the input buffer area of the memory 13 by way of the memory data signal 22 with reference to the first clock signal 21.

The overlaying means 12 reads out the third digital video signal 62 written in the memory 13 by the memory data signal 22, overlays the signal 62 and the graphic signal 11, and writes it into the output buffer area of the memory 13 as the fourth overlaid digital signal 63. Then, in synchronization with the second clock signal 21, the fourth overlaid digital signal 63 is output from the memory 13 by way of the memory data 22 and supplied to the D/A converting means.

The fourth overlaid digital signal 63 is converted into the fourth analog signal 64 by the D/A converting means 16 in synchronization with the second clock signal 32.

As the method of generating the fourth overlaid digital signal, in addition to the above-described method in which the third digital video signal 62 is written into the input buffer area of the memory 13 and the fourth overlaid digital signal 63 is written into the output buffer area of the memory 13 both by way of the memory data signal 22, a method is possible in which only the third digital video signal 63 is written into and read from the input buffer area of the memory 13, by way of the memory data signal 22, and after the third digital video signal 63 being readout and the graphic signal 11 are overlaid by the overlaying means 12, then, the fourth overlaid digital signal 63 is supplied to the D/A converting means in synchronization with the second clock signal 31. In this case, only the input buffer area is necessary for the memory 13.

As described above, in the fourth embodiment of the present invention, since the fourth overlaid digital video signal 63 is synchronized with the second clock signal 32 and the D/A conversion is performed in synchronization with the second clock signal 32, the fourth analog video signal 64 obtained by decreasing the spatial resolution of the first digital video signal 9 can be displayed on the display means 18 without any display frame disturbances being caused.

Fifth Embodiment

An image decoding apparatus according to the fifth invention of the present application is a decoding apparatus in which a digital transport stream is input and decoded that is obtained by multiplexing a digital video bit stream obtained by coding an image by frame coding or field coding, and a time stamp signal. De-multiplexing means extracts the digital video bit stream and the time stamp signal from the digital transport stream. First clock reproducing means reproduces the first clock signal from the time stamp signal. Decoding means decodes the digital video bit stream, and outputs the first digital video signal having the first frame frequency and synchronizing with the first clock signal. Overlaying means overlays a graphic signal generated by graphic generating means and the first digital video signal, and outputs the first overlaid digital signal synchronizing with the first clock signal. Switching means switches between the first clock signal and the third clock signal independent of the first clock signal, and supplies the fourth clock signal. D/A converting means converts the fourth overlaid digital signal into the first analog signal in synchronization with the fourth clock signal.

Hereinafter, the fifth embodiment of the present invention will be described with reference to a drawing.

Figure 6:
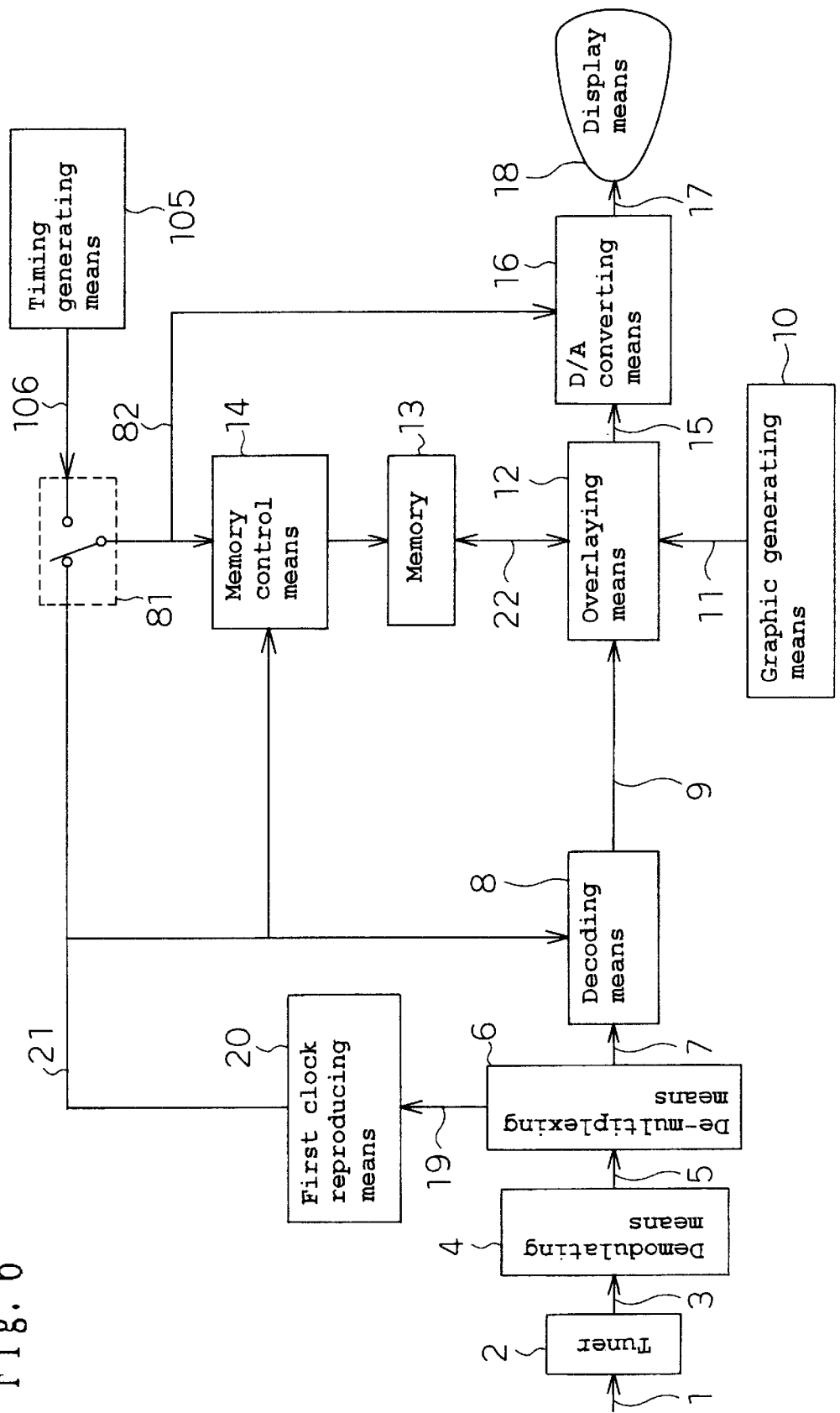
FIG. 6 is a block diagram of an image decoding apparatus according to the fifth embodiment of the present invention.

FIG. 6 is a block diagram of the image decoding apparatus according to the fifth embodiment of the present invention.

In FIG. 6, the elements 10 to 14, 16, 18, 22, 105 and 106 are the same as those of the conventional example shown in FIG. 10. The clock 106 for D/A conversion is referred to as the third clock signal in this embodiment. The elements 1 to 9 and 15 to 21 are the same as those of the first embodiment of the present invention shown in FIG. 1.

Reference numeral 81 represents the switching means. Reference numeral 82 represents a clock signal chosen by the switching means 81 between the first clock signal 21 and the third clock signal 106 (hereinafter, this clock signal will be referred to as the fourth clock signal).

Here, the digital video bit stream is one obtained by compressing a video signal with 480 active scanning lines, 704 active pixels per line and the first frame frequency of 59.94 frames per second in compliance with MPEG-2/H-14.

The operation of the image decoding apparatus thus structured will be described.

The input high-frequency signal 1 is channel-selected by the tuner 2. The digital modulated signal 3 of the selected channel is supplied to the demodulating means 4 to be demodulated, so that the digital transport stream 5 is obtained. From the digital transport stream 5, the digital video bit stream 7 and the time stamp signal 19 are separated by the de-multiplexing means 6.

The digital video bit stream 7 is decompressed by the decoding means 8 and the first digital video signal 9 is output. The time stamp signal 19 is supplied to the first clock reproducing means 20, and as the first clock signal 21, a clock of 27 MHz is reproduced.

In this embodiment, the memory 13 has an input buffer area into which the first digital video signal 9 is written and an output buffer area into which the first overlaid digital signal 15 is written.

The first clock signal 21 is supplied to the decoding means 8 to be used as a sample clock for outputting the first digital video signal 9, and simultaneously therewith, the first clock signal 21 is supplied to the memory control means 14 to be used for writing the first digital video signal 9 into the input buffer area of the memory 13 by way of the memory data signal 22. The overlaying means 12 reads out the first digital video signal 9 written in the input buffer area of the memory 13, overlays the signal 9 and the graphic signal, and writes it into the output buffer area of the memory 13 as the first overlaid digital signal 15.

The switching means 81 switches between the first clock signal 21 and the third clock signal 106 to generate the fourth clock signal 82.

The first overlaid digital signal 15 read out from the memory 13 in synchronization with the fourth clock signal 82 supplied to the memory control means 14 is supplied to the D/A converting means 16.

The fourth clock signal 82 is supplied to the D/A converting means 16 to be used as a reference clock for D/A conversion, and is converted into the analog video signal 17 at the timing of the fourth clock signal 82 to be displayed on the display means 18.

As the method of generating the first overlaid digital signal 15, in addition to the above-described method in which the first digital video signal 9 is written into the input buffer area of the memory 13 and the first overlaid digital signal 15 is written into the output buffer area of the memory 13 both by way of the memory data signal 22, a method is possible in which only the first digital video signal 9 is written into and read from the input buffer area of the memory 13 by way of the memory data signal 22, is overlaid or the graphic signal 11 by the overlaying means 12, and then, the first overlaid digital signal 15 is supplied to the D/A converting means in synchronization with the four clock signal 82. In this case, only the input buffer area is necessary for the memory 13.

As described above, in the fifth embodiment of the present invention, since the first digital video signal 9 output from the decoding means 8, the first overlaid digital signal 15 read out from the memory 13 by way of the memory data signal 22 and the D/A converting means 16 are synchronized with one another, display can be provided on the display means 18 without any display frame disturbances being caused. Moreover, since the number of display frames can independently be set by performing D/A conversion asynchronous to the overlaid digital signal, remarkable convenience is provided for the user. Specifically, for example, when jitter of a graphic image displayed on the display means 18 is annoying, the third clock signal 106 is chosen by the switching means 81.

Sixth Embodiment

An image decoding apparatus according to the sixth invention of the present application is a decoding apparatus in which a digital transport stream is input and decoded that is obtained by multiplexing a digital video bit stream obtained by coding an image by frame coding or field coding, and a time stamp signal. De-multiplexing means extracts the digital video bit stream and the time stamp signal from the digital transport stream. First clock reproducing means reproduces the first clock signal from the time stamp signal. Second clock reproducing means reproduces the second clock signal from the first clock reproducing means. Decoding means decodes the digital video bit stream, and outputs the first digital video signal having the first frame frequency and synchronizing with the first clock signal. At least the first digital video signal is written into the memory 13. Overlaying means overlays a graphic signal generated by graphic generating means and the first digital video signal read out from the memory 13, and outputs the second overlaid digital signal synchronizing with the first clock signal and having the second frame frequency. Switching means switches to one clock signal (this will be referred to as the fourth clock signal) of the second clock signal and the third clock signal independent of the second clock signal, and outputs the clock signal. D/A converting means converts the second overlaid digital signal into the second analog signal in synchronization with the fourth clock signal.

Hereinafter, the sixth embodiment of the present invention will be described with reference to a drawing.

Figure 7:
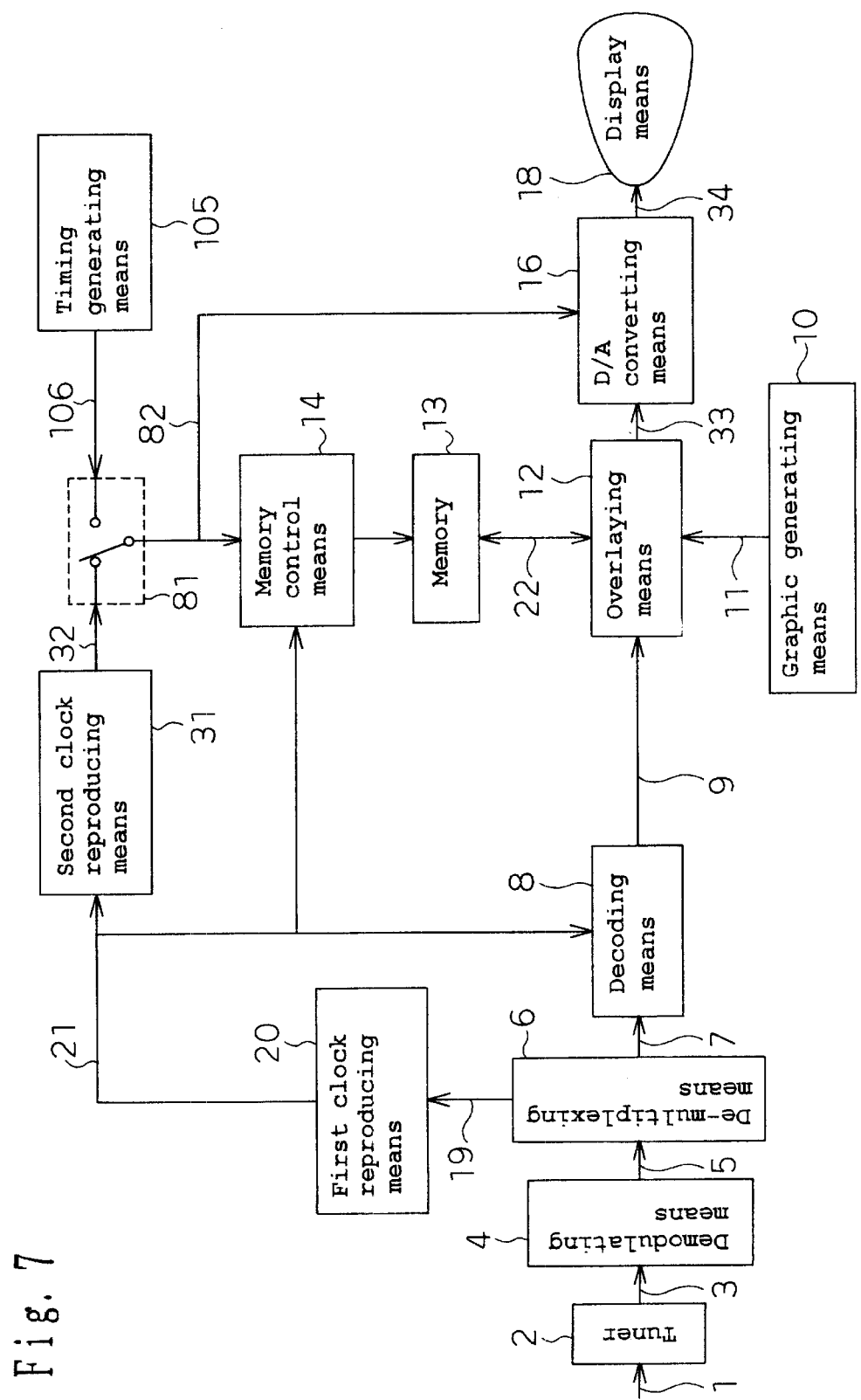
FIG. 7 is a block diagram of an image decoding apparatus as an example of modification of the second embodiment of the invention.

FIG. 7 is a block diagram of the image decoding apparatus according to the sixth embodiment of the present invention.

In FIG. 7 the elements 10 to 14, 16, 18, 22, 105 and 106 are the same as those of the conventional example of FIG. 10, the elements 1 to 9 and 15 to 21 are the same as the first embodiment of the present invention shown in FIG. 1. The elements 31 to 34 are the same as those of the second embodiment of the present invention. The elements 81 to 82 are the same as those of the fifth embodiment of the present invention.

The sixth embodiment of the present invention basically operates in a similar manner to the second embodiment of the present invention, but is different therefrom in that the switching means 81 is provided. That is, the switching means 81 switches between the second clock signal 32 and the third clock signal 106 to generate the fourth clock signal 82.

The second overlaid digital signal 33 read out from the memory 13 in synchronization with the fourth clock signal 82 supplied to the memory control means 14 is supplied to the D/A converting means 16.

The fourth clock signal 82 is supplied to the D/A converting means 16 to be used as a reference clock for D/A conversion, and is converted into the second analog video signal 34 at the timing of the fourth clock signal 82 to be displayed on the display means 18.

As described above, in the sixth embodiment of the present invention, since the second overlaid digital video signal 33 is synchronized with the second clock signal 32 and the D/A conversion by the D/A converting means 16 is performed in synchronization with the second clock signal 32, the second analog video signal 34 having a frame frequency 2.5 times that of the first digital video signal 9 can be displayed on the display means 18 without any display frame disturbances being caused. Moreover, since the number of display frames can independently be set by performing D/A conversion asynchronous to the second clock signal, remarkable convenience is provided for the user.

In the third and the fourth embodiments, like in the above-described sixth embodiment, the switching means 81 may be provided in a stage succeeding the second clock generating means 31 so that one of the second clock signal 32 and the third clock signal 106 can be chosen. This structure enables the frame frequency of the image displayed on the display means 18 to be freely switched. Structural views in which the switching means 81 is added to the structures of the third and the fourth embodiments as mentioned above are shown in FIGS. 8 and 9.

As described above, in the image decoding apparatus according to the first invention of the present application, for example, since the first digital video signal output from the decoding means, the overlaid digital signal read out from the memory and the D/A converting means are synchronized with one another, the first digital video signal can be displayed on the display means without any display frame disturbances being caused.

Moreover, in the image decoding apparatus according to the second invention of the present application, for example, since the second overlaid digital video signal is synchronized with the second clock signal and the D/A conversion is performed in synchronization with the second clock signal, the second analog video signal having the second frame frequency set at a frequency higher than the first frame frequency of the first digital video signal can be displayed on the display means without any display frame disturbances being caused, and display flicker can be reduced.

Moreover, in the image decoding apparatus according to the third invention of the present application, for example, since the third overlaid digital video signal is synchronized with the second clock signal and the D/A conversion is performed in synchronization with the second clock signal, the third analog video signal obtained by increasing the spatial resolution of the first digital video signal can be displayed on the display means without any display frame disturbances being caused.

Moreover, in the image decoding apparatus according to the fourth invention of the present application, for example, since the fourth overlaid digital video signal is synchronized with the second clock signal and the D/A conversion is performed in synchronization with the second clock signal, the fourth analog video signal obtained by decreasing the spatial resolution of the first digital video signal can be displayed on the display means without any display frame disturbances being caused.

Moreover, in the image decoding apparatus according to the fifth invention of the present application, for example, the first digital video signal output from the decoding means, a signal including at least the first digital video signal read out from the memory and the D/A converting means are synchronized with one another. For this reason, the analog video signal can be displayed on the display means without any display frame disturbances being caused. Moreover, since the frame frequency of the displayed image can independently be set by performing D/A conversion independent of the first clock signal, remarkable convenience is provided for the user as described above.

Moreover, in the image decoding apparatus according to the sixth invention of the present application, for example, the timing generating means for generating the third clock signal independent of the second clock and the switching means for switching to one clock signal of the second clock signal and the third clock signal are further provided in addition to the structure of the above-described second invention, and the D/A converting means converts the second digital signal into the second analog signal in synchronization with the clock signal output from the switching means. That is, in the case of this structure, for example, as shown in FIG. 7, since the second overlaid digital video signal is synchronized with the second clock signal and the D/A conversion is performed in synchronization with the second clock signal, the second analog video signal having the second frame frequency set to a frequency higher than the first frame frequency of the first digital video signal can be displayed on the display means without any display frame disturbances being caused. Moreover, since the frame frequency of the displayed image can independently be set by performing D/A conversion independent of the second clock signal, remarkable convenience is provided for the user.

Figure 8:
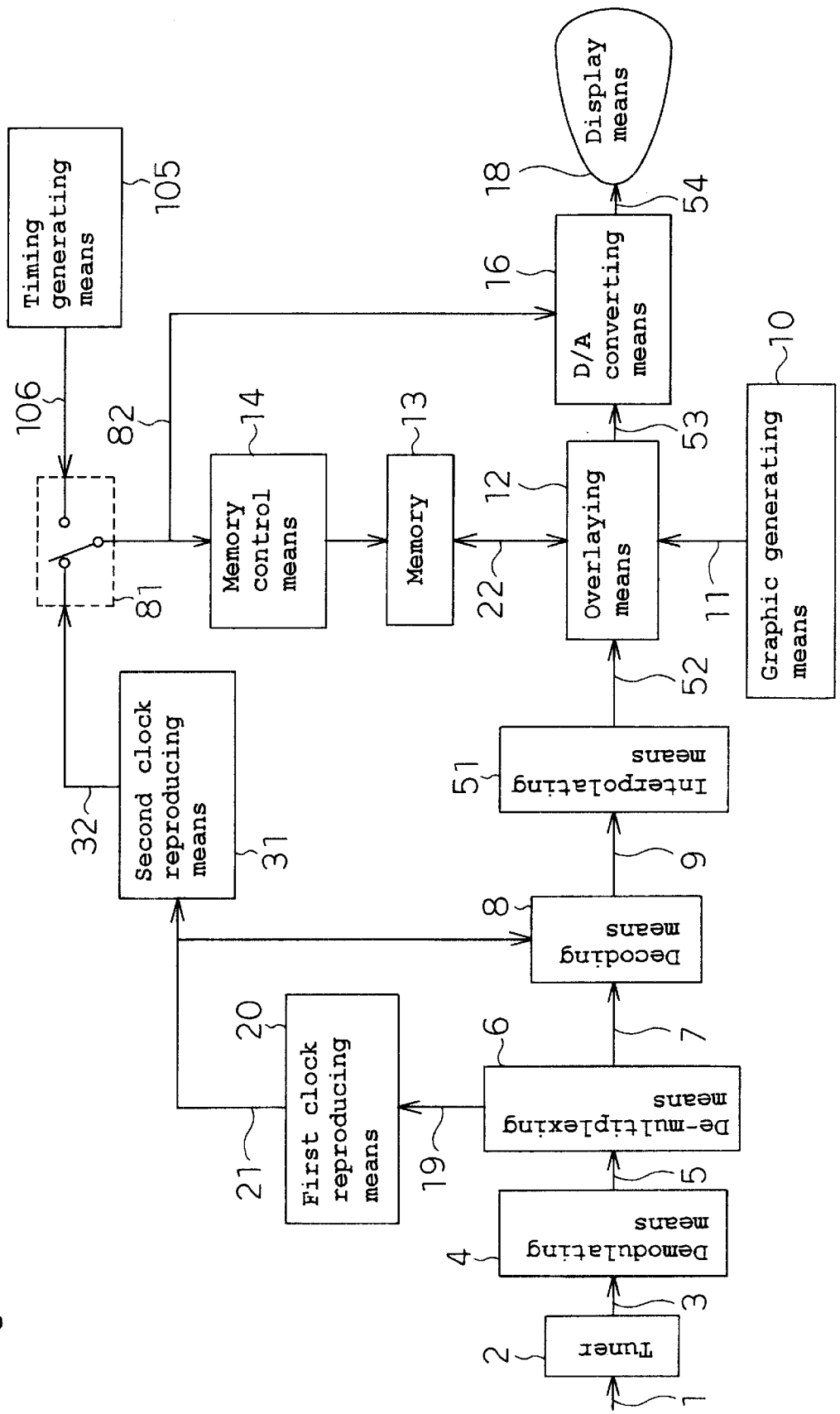
FIG. 8 is a block diagram of an image decoding apparatus as example of modification of the third embodiment of the invention.

Moreover, in the image decoding apparatus according to the seventh invention of the present application, for example, the timing generating means for generating the third clock signal independent of the second clock signal and the switching means for switching to one clock signal of the second clock signal and the third clock signal are further provided in addition to the structure of the above-described second invention, and the D/A converting means converts the third overlaid digital signal into the third analog signal in synchronization with the clock signal output from the switching means. That is, in the case of this structure, for example, as shown in FIG. 8, since the third overlaid digital video signal is synchronized with the second clock signal and the D/A conversion is performed in synchronization with the second clock signal, the third analog video signal obtained by increasing the spatial resolution of the first digital video signal can be displayed on the display means with out any display frame disturbances being caused. Moreover, since the number of display frames can independently be set by performing D/A conversion independent of the second clock signal, remarkable convenience is provided for the user.

Figure 9:
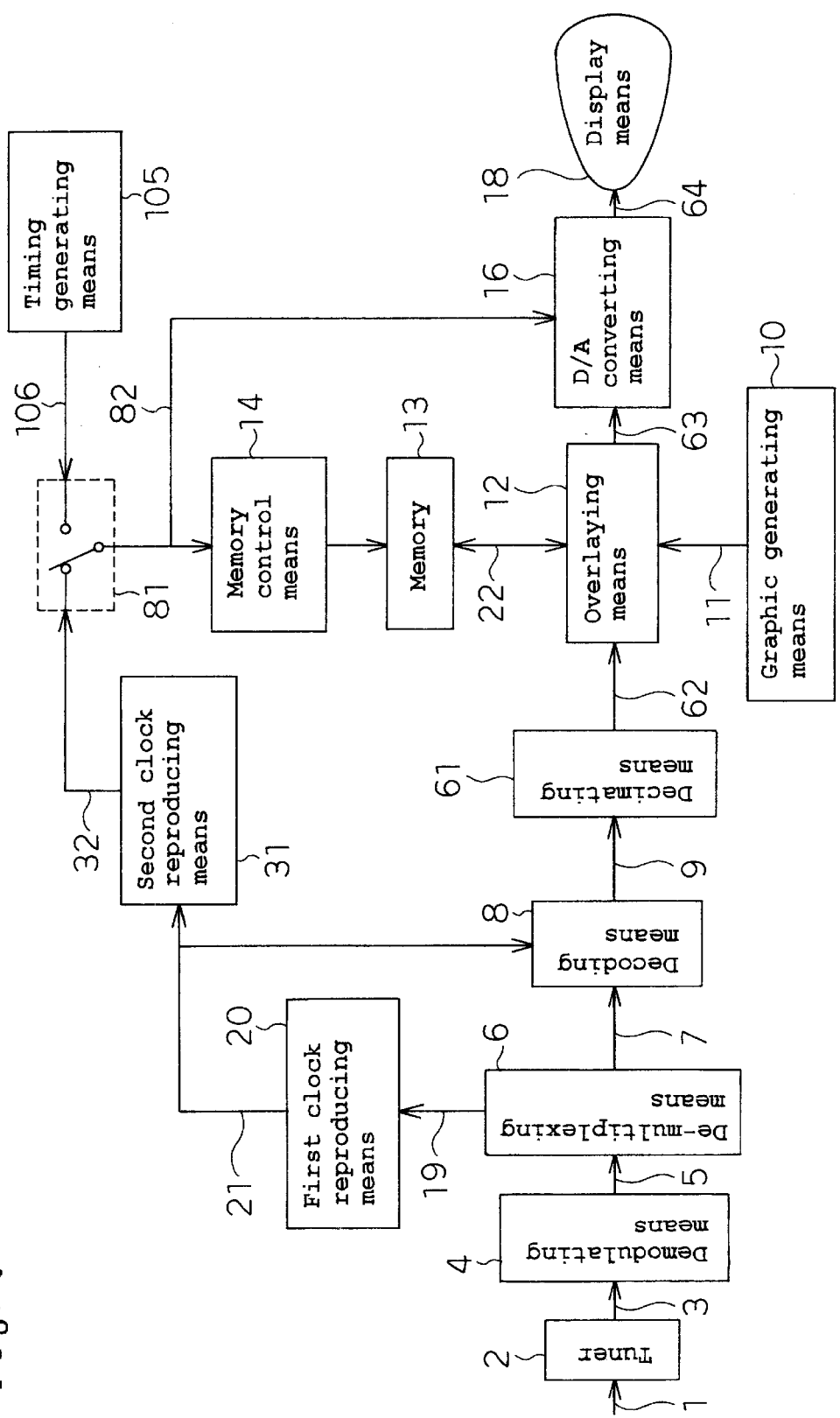
FIG. 9 is a block diagram of an image decoding apparatus as an example of modification of the fourth embodiment of the invention.

Moreover, in the image decoding apparatus according to the eighth invention of the present application, for example, the clock generating means for generating the third clock signal independent of the second clock signal and the switching means for switching to one clock signal of the second clock signal and the third clock signal are further provided in addition to the structure of the above-described third invention, and the D/A converting means converts the fourth overlaid digital signal into the third analog signal in synchronization with the clock signal output from the switching means. That is, in the case of this structure, for example, as shown in FIG. 9, since the fourth overlaid digital video signal is synchronized with the second clock signal and the D/A conversion is performed in synchronization with the second clock signal, the fourth analog video signal obtained by decreasing the spatial resolution of the first digital video signal can be displayed on the display means without any display frame disturbances being caused. Moreover, since the number of display frames can independently be set by performing D/A conversion independent of the second clock signal, remarkable convenience can be provided for the user.

INDUSTRIAL APPLICABILITY

As described above, according to the present invention, for example, by forming an image decoding apparatus comprising: the first clock reproducing means for reproducing the first clock signal from the time stamp signal extracted from the digital transport stream; the decoding-means for decoding the digital video stream and outputting the first digital video signal synchronizing with the first clock and having the first frame frequency; the graphic generating means; the overlaying means for overlaying the first digital video signal and the graphic signal and outputting the first overlaid digital video signal synchronizing with the first clock signal; and the D/A converting means for converting the first overlaid digital video signal into the analog signal, even when the digital video signal and the graphic signal are displayed being overlaid, an image without any missing frames or display disturbances can be obtained.

What is claimed is:

1. An image decoding apparatus for decoding an image from a digital transport stream obtained by multiplexing a digital video bit stream being frame-coded or field-coded and a time stamp signal, comprising:

de-multiplexing means for extracting the digital video bit stream and the time stamp signal from the digital transport stream;

first clock reproducing means for reproducing a first clock signal from the time stamp signal;

decoding means for decoding the digital video bit stream and outputting a first digital video signal having a first frame frequency synchronized with the timing of first clock signal;

graphic generating means for generating a graphic signal;

overlaying means for overlaying the first digital video signal and the graphic signal and outputting a first overlaid digital signal synchronized with the timing of first clock signal;

memory means for storing at least the first digital video signal;

digital-to-analog converting means for converting the first overlaid digital signal into a first analog signal synchronized with the timing of first clock signal timing generating means for generating a third clock signal independent of the first clock signal; and switching means for choosing one clock signal between the first clock signal and the third clock signal between the first clock signal and the third clock signal and outputting the chosen clock signal, wherein the digital-to-analog converting means is synchronized with the clock signal output from the switching means.

2. An image decoding apparatus for decoding an image from a digital transport stream obtained by multiplexing a digital video bit stream being frame-coded or field-coded, and a time stamp signal comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream and outputting a first digital video signal having a first frame frequency synchronized with the timing of first clock signal;

graphic generating means for generating a graphic signal;

overlaying means for overlaying the first digital video signal and the graphic signal and the graphic signal and outputting a second overlaid digital signal synchronized with the timing of first clock signal and having a second frame frequency;

memory means for storing at least the first digital video signal;

digital-to-analog converting means for converting the second overlaid digital signal into a second analog signal synchronized with the timing of first clock signal timing generating means for generating a third clock signal independent of the second clock signal; and switching means for choosing one clock signal between the second clock signal and the third clock signal and outputting the chosen clock signal, wherein the digital-to-analog converting means is synchronized with the clock signal output from the switching means.

3. An image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream arid outputting a first digital video signal having a first frame frequency synchronized with the timing of first clock signal;

graphic generating means for generating a graphic signal;

interpolating means for outputting a second digital video signal obtained by increasing a spatial resolution of the first digital video signal;

overlaying means for overlaying the second digital video signal and the graphic signal and outputting a third overlaid digital signal synchronized with the timing of first clock signal;

memory means for storing at least the second digital video signal;

digital-to-analog converting means for converting the third overlaid digital signal into a third analog signal synchronized with the timing of first clock signal timing generating means for generating a third clock signal independent to the second clock signal; and switching means for choosing one clock signal between the second clock signal and the third clock signal and outputting the chosen clock signal, wherein the digital-to-analog converting means is synchronized with the clock signal output from the switching means.

4. An image decoding apparatus for decoding an image from a digital transport stream obtained by multiplexing a digital video bit stream being frame-coded or field-coded, and a time stamp signal, comprising:

de-multiplexing means for extracting the digital video bit stream and the time stamp signal from the digital transport stream;

first clock reproducing means for reproducing a first clock signal from the time stamp signal;

second clock reproducing means for reproducing a second clock signal from the first clock signal;

decoding means for decoding the digital video bit stream and outputting a first digital video signal having a first frame frequency synchronized with the timing of the first clock signal;

graphic generating means for generating a graphic signal;

decimating means for outputting a third digital video signal obtained by decreasing a spatial resolution of the first digital video signal;

overlaying means for overlaying the third digital video signal and the graphic signal and outputting a fourth overlaid digital signal synchronized with the timing of second clock signal;

memory means for storing at least the third digital video signal;

digital-to-analog converting means for converting the fourth overlaid digital signal into a fourth analog signal synchronized with the timing of second clock signal timing generating means for generating a third clock signal independent of the second clock signal; and switching means for choosing one clock signal between the second clock signal and the third clock signal and outputting the chosen signal, wherein the digital-to-analog converting means is synchronized with the clock signal output from the switching means.

* * * * *